(12) United States Patent
Hess et al.

(10) Patent No.: US 8,757,052 B2
(45) Date of Patent: Jun. 24, 2014

(54) CONVEYOR GRIDDLE SYSTEM

(75) Inventors: Hans Karl Hess, Arlington, VA (US); Dustin Harian Cram, Vancouver, WA (US)

(73) Assignee: EBIP Holdings, LLC, Arlington, VA (US)

( * ) Notice: Subject to any disclaimer, the term of this patent is extended or adjusted under 35 U.S.C. 154(b) by 442 days.

(21) Appl. No.: 12/941,019

(22) Filed: Nov. 5, 2010

(65) Prior Publication Data

US 2011/0100231 A1 May 5, 2011

Related U.S. Application Data

(60) Provisional application No. 61/258,267, filed on Nov. 5, 2009.

(51) Int. Cl.
*A47J 37/00* (2006.01)

(52) U.S. Cl.
USPC .................... 99/423; 99/427; 99/443 C

(58) Field of Classification Search
USPC ............ 99/422, 427, 443 C, 443 R, 386, 393, 99/391
See application file for complete search history.

(56) References Cited

U.S. PATENT DOCUMENTS

| | | | | |
|---|---|---|---|---|
| 992,417 | A * | 5/1911 | Gale | 99/379 |
| 2,362,757 | A * | 11/1944 | Lang | 99/425 |
| 2,367,105 | A * | 1/1945 | Donaldson | 294/61 |
| 2,778,504 | A * | 1/1957 | Byrne | 211/1.56 |
| 2,899,947 | A * | 8/1959 | Van Arsdell | 123/349 |
| 3,460,461 | A | 8/1969 | Adamson et al. | |
| 3,604,336 | A | 9/1971 | Straub et al. | |
| 3,718,487 | A * | 2/1973 | Brunner | 99/353 |
| 3,965,807 | A | 6/1976 | Baker | |
| 4,176,589 | A | 12/1979 | Stuck | |
| 4,213,380 | A | 7/1980 | Kahn | |
| 4,389,562 | A | 6/1983 | Chaudoir | |
| 4,444,094 | A | 4/1984 | Baker et al. | |
| 4,488,480 | A | 12/1984 | Miller et al. | |
| 4,567,819 | A | 2/1986 | Adamson | |
| 4,586,428 | A | 5/1986 | Adamson | |
| 4,784,869 | A | 11/1988 | Bishop | |
| 5,197,377 | A * | 3/1993 | Jennings et al. | 99/349 |
| 5,458,051 | A | 10/1995 | Alden et al. | |
| 5,588,354 | A | 12/1996 | Stuck et al. | |
| 5,713,264 | A | 2/1998 | Pomara | |
| 5,951,895 | A | 9/1999 | Green et al. | |

(Continued)

*Primary Examiner* — Henry Yuen
*Assistant Examiner* — John J Norton
(74) *Attorney, Agent, or Firm* — White-Welker & Welker, LLC; Matthew T. Welker, Esq.

(57) ABSTRACT

Conveyor griddle system allowing for a one-piece-flow, pull system of production holding a series of adjacent metal cooking plates, heated by several natural gas burners, electric, or infrared burners located immediately below said plates and running the length of the conveyor. The system is comprised of a drive assembly, a driven assembly, and one or more burner assemblies. Plates are located adjacent to one another, with the long dimension perpendicular to the direction of plate travel and therefore, the short dimension parallel to the direction of travel. Each plate constructed of cast iron or other metal surface suitable for commercial cooking equipment. Each plate has a single partition approximately midway through the plate that is approximately ½" high parallel to the short dimension and parallel to the direction of travel. Plates also contain a simple way to attach a clip or spike that is capable of holding a paper ticket.

20 Claims, 12 Drawing Sheets

(56) References Cited

U.S. PATENT DOCUMENTS

| | | | |
|---|---|---|---|
| 6,707,014 B1 * | 3/2004 | Corey et al. | 219/494 |
| 6,736,051 B2 | 5/2004 | Frantz et al. | |
| 6,834,577 B2 * | 12/2004 | Xu | 99/409 |
| 7,001,626 B2 | 2/2006 | Sands et al. | |
| 7,038,172 B1 | 5/2006 | Stuck | |
| 7,059,467 B2 | 6/2006 | Sands et al. | |
| 7,067,769 B2 | 6/2006 | Sands et al. | |
| 7,325,483 B2 | 2/2008 | Szymanski | |
| 7,337,895 B2 * | 3/2008 | De Maeyer | 198/860.2 |
| 2008/0141868 A1 | 6/2008 | Cook et al. | |
| 2010/0116150 A1 * | 5/2010 | Fiock et al. | 99/443 |

* cited by examiner

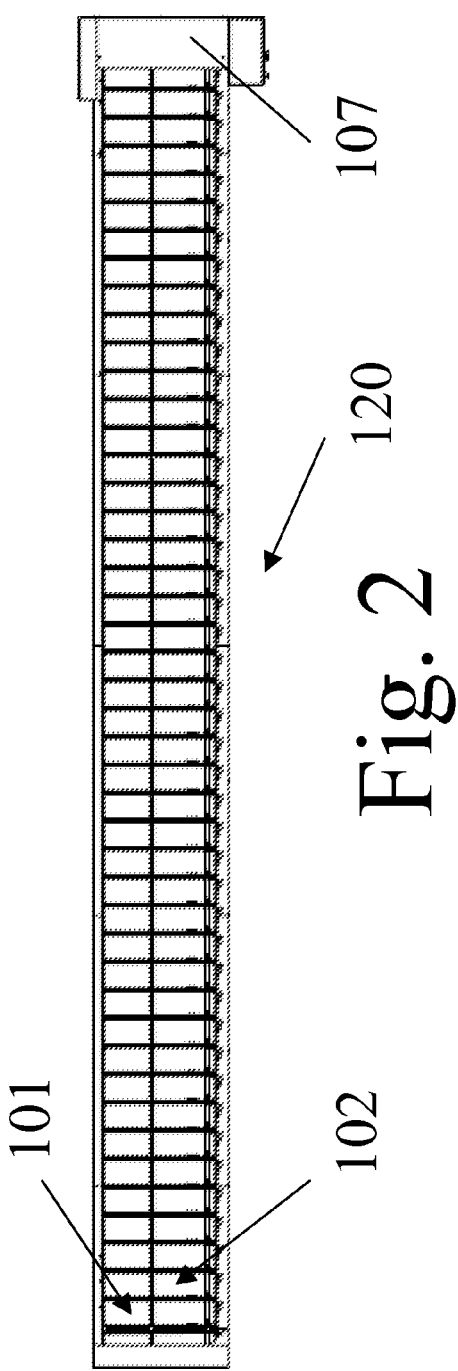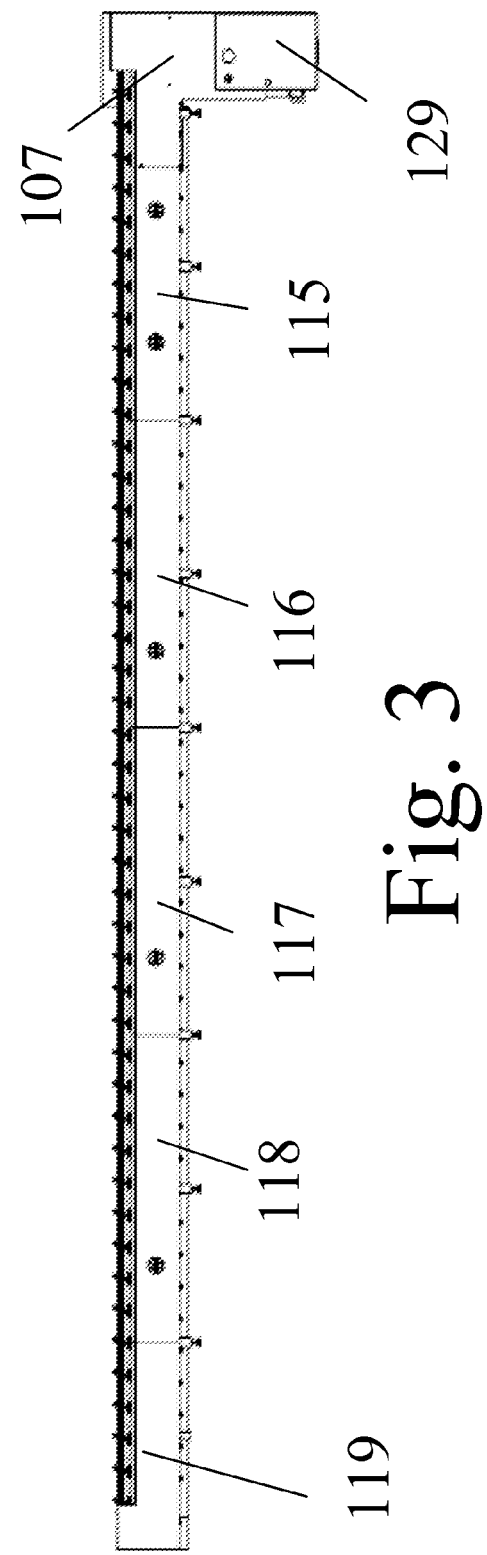

CONVEYOR GRIDDLE SYSTEM

CROSS REFERENCE TO RELATED APPLICATIONS

This application claims priority from U.S. Patent Application Ser. No. 61/258,267, entitled "Conveyor Griddle System", filed on 5 Nov. 2009. The benefit under 35 USC §119(e) of the United States provisional application is hereby claimed, and the aforementioned application is hereby incorporated herein by reference

FEDERALLY SPONSORED RESEARCH

Not Applicable

SEQUENCE LISTING OR PROGRAM

Not Applicable

TECHNICAL FIELD OF THE INVENTION

The present invention relates generally to a conveyor, belt, or chain griddle cooking system. More specifically, the present invention relates to such a device useful in fast food type applications wherein large quantities of food portions are cooked rapidly and uniformly.

BACKGROUND OF THE INVENTION

Conveyor, chain, and belt cooking devices known have been in use for processing food products such as hamburgers and other meat patties, chicken and fish filets, pancakes, sandwiches, and other foods. Cooking is achieved by heat conduction to the food product as it is conveyed through heated plates. Cooking is typically achieved through convection and forced air approaches in a conveyor environment. The present invention on the other hand is novel and non-obvious because it uses a griddle plate in combination with the conveyor system and doesn't rely on forced air or air-convection techniques. Typically, a conveyor, chain, or belt cooking device uses a single plate or a combination of upper and lower plates arranged in parallel planes which are heated by conventional means such as electricity, gas or the like.

U.S. Pat. No. 3,604,336 describes an automated cooking device for flame-broiling hamburger patties. According to this invention, the patties are placed at predetermined intervals on a conveyor belt. The conveyor belt, which comprises a series of transverse parallel bars attached to two lateral side chains, moves the patties through a plurality of cooking stations, stopping at each station to allow further cooking of the patties. Each cooking station comprises two opposed open-flame gas burners, one underneath and one above the conveyor. The patties are thus flame-broiled from both sides at once.

While this device provides uniformity of cooking time and temperature, it has several disadvantages. First, because there is no solid surface supporting the hamburger patties while they are being cooked, fat and juices created during the cooking process drip down onto and below the lower gas burners. This creates a need for shielding the gas burners from the drippings while still allowing heat transfer from the burners to the patties. Such shielding is costly and not completely effective. Additionally, this device's enclosed design prevents guests from observing the food cooking process.

U.S. Pat. No. 5,197,377 describes a clamshell cooking apparatus. This apparatus comprises a heated upper cook plate assembly. The upper plate pivots down on hinges to cook the upper side of a hamburger at the same time that the lower side is being cooked. While this reduces cooking time and labor requirements, it does not eliminate the need for a human operator to place and remove the patties from the cooking area. Nor does this device eliminate the possibility of errors in judgment on the part of the human operator concerning the best cooking time for optimum taste and consumer safety. Furthermore this process is only fully functional when used as a batch method, which makes customized production difficult since the batches must be stored in holding bins before being served to the customer.

Therefore, a need has arisen for a new method and system for grilling food products that overcomes the disadvantages and deficiencies of the prior art. In particular, it is an object of the present invention to provide a system for automatically grilling food products not in batches but in a "one-piece-flow" method, which utilizes discrete, individualized cooking surfaces, which enables an effective implementation of "pull" style production.

Another object of the invention is to provide a system that is capable of automatically cooking a variety of food items, including hamburgers and the buns on which they are placed on the same conveyor device.

A further object of the invention is to provide a system that automatically cooks food products for a desired period of time, providing the optimum taste and safety for the consumer.

Another objective of the present invention is to cook the food in view of the customer in a potentially interactive manner.

Still another objective of the present invention is to optimize the relationship between preparation spaces and cooking spaces.

Yet another objective of the present invention is to create cooking temperature options for the guest.

SUMMARY OF THE INVENTION

The present invention is a conveyor griddle system designed to hold a series of adjacent metal cooking plates, which will be heated by several heating elements, either natural gas burner-tubes, infrared burners, or electric heating elements located immediately below said plates and running the length of the conveyor. The heating elements should be adjustable in their output and capable of heating the plates. The plates should be located adjacent to one another, placed at appropriate intervals along the direction of travel. Each plate should be constructed of a material suitable for commercial cooking equipment such as stainless steel or cast iron or any material deemed appropriate by one skilled in the art. In one embodiment each plate has a single partition approximately midway through the plate that is approximately ½" high that divides two food products being cooked on the same plate.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 2 is a top view of the griddle assembly of the present invention;

FIG. 3 is a side view of the griddle assembly of the present invention;

DETAILED DESCRIPTION OF THE INVENTION

Figure 1:
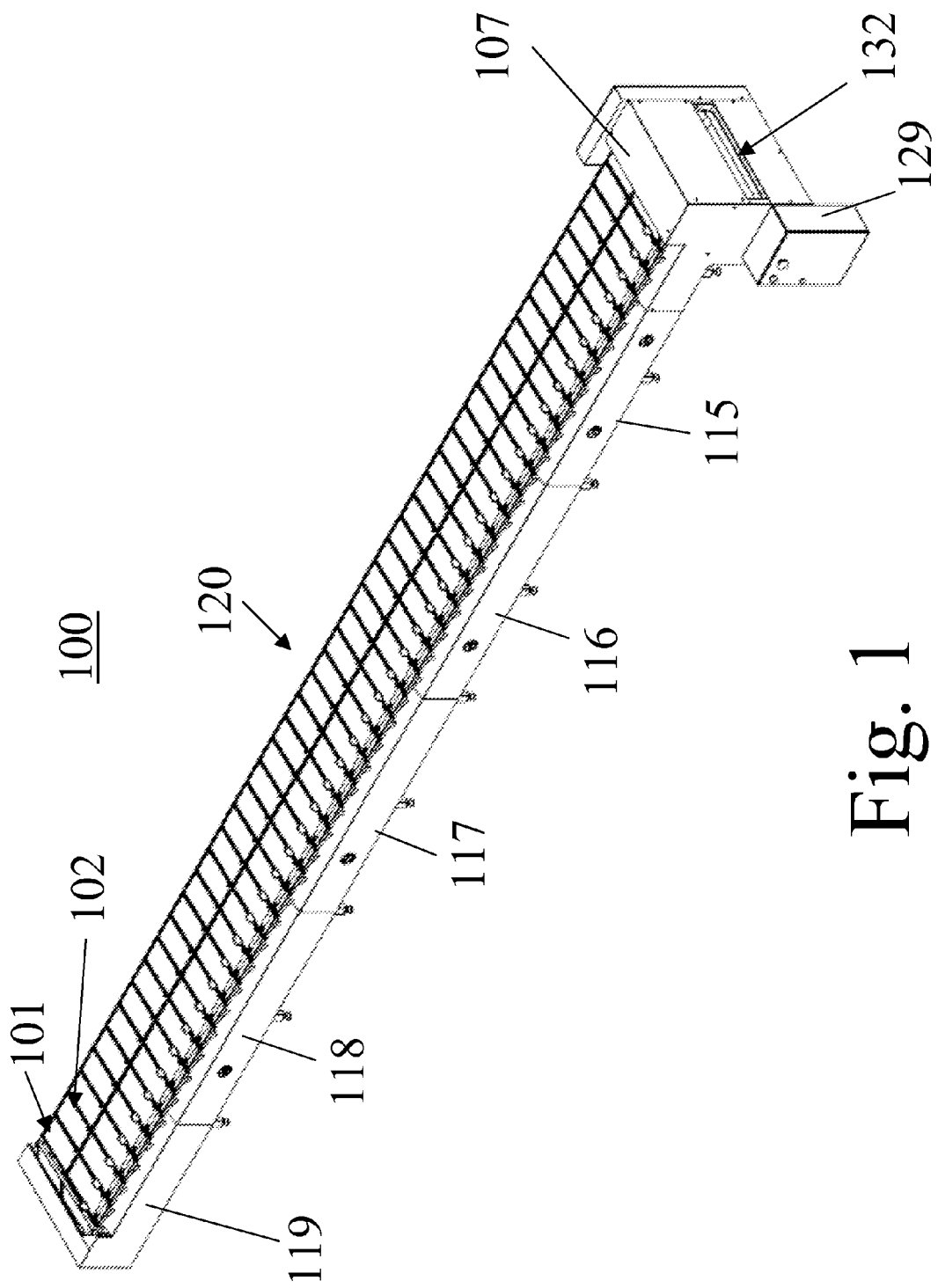
FIG. 1 is a perspective view of the griddle assembly of the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Now referring to Figures, the apparatus of the present invention is comprised of the following components. A chain conveyor system 100 is designed to hold a series of adjacent metal cooking plates 101 on a burner assembly 102 that will be heated by several natural gas heating element assemblies 103 located immediately below said plates 101 and running the length of the conveyor system 100. Each of these assemblies consists of conveyor chain guides 140 and 141 and numerous heating element assemblies 103. These conveyor chain guides 140 and 141 are the backbone of the conveyor system 100 and support the series of adjacent metal cooking plates 101 and conveyor chains 105 and 139, creating a low-friction rolling assembly. The heating element assemblies 103 should be individually adjustable in their output and capable of heating the plates to as much as 600 degrees Fahrenheit.

Referring to FIGS. 1-4, the chain conveyor system 100 is shown. In FIG. 1, the chain conveyor system 100 is comprised of a drive assembly 107 connected to a plurality of burner assemblies 115-118 and a driven assembly 119. The drive assembly 107 provides the controls, which are located within a locked control panel 129 and electric motor for driving the conveyor chains 105 and 139 from one end to the other and back on which a plurality of adjacent metal cooking plates 101 are connected and rotated over the cooking or griddle area 120. The driven assembly 119 provides an opposing end to the drive assembly 107, which enables the chains 105 and 139 and attached adjacent metal cooking plates 101 to rotate around and return, under the cooking or griddle area 120, to the driven assembly 119 for re-use on the cooking or griddle area 120. The burner assemblies 115-118 provide heat to the cooking or griddle area 120 on which a food product is cooked.

Figure 4:
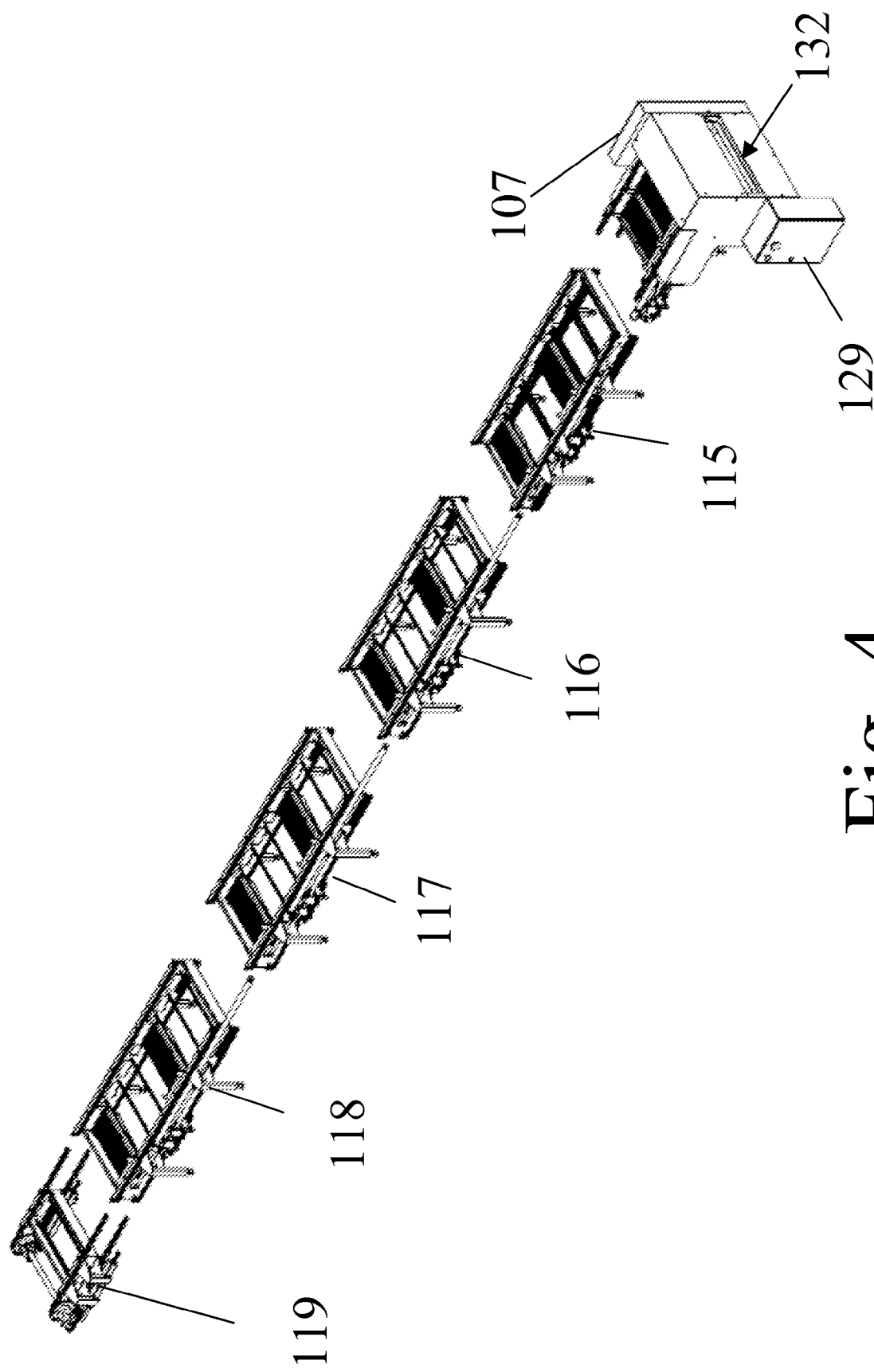
FIG. 4 is a perspective view of the assembly components of the present invention.
Figure 5:
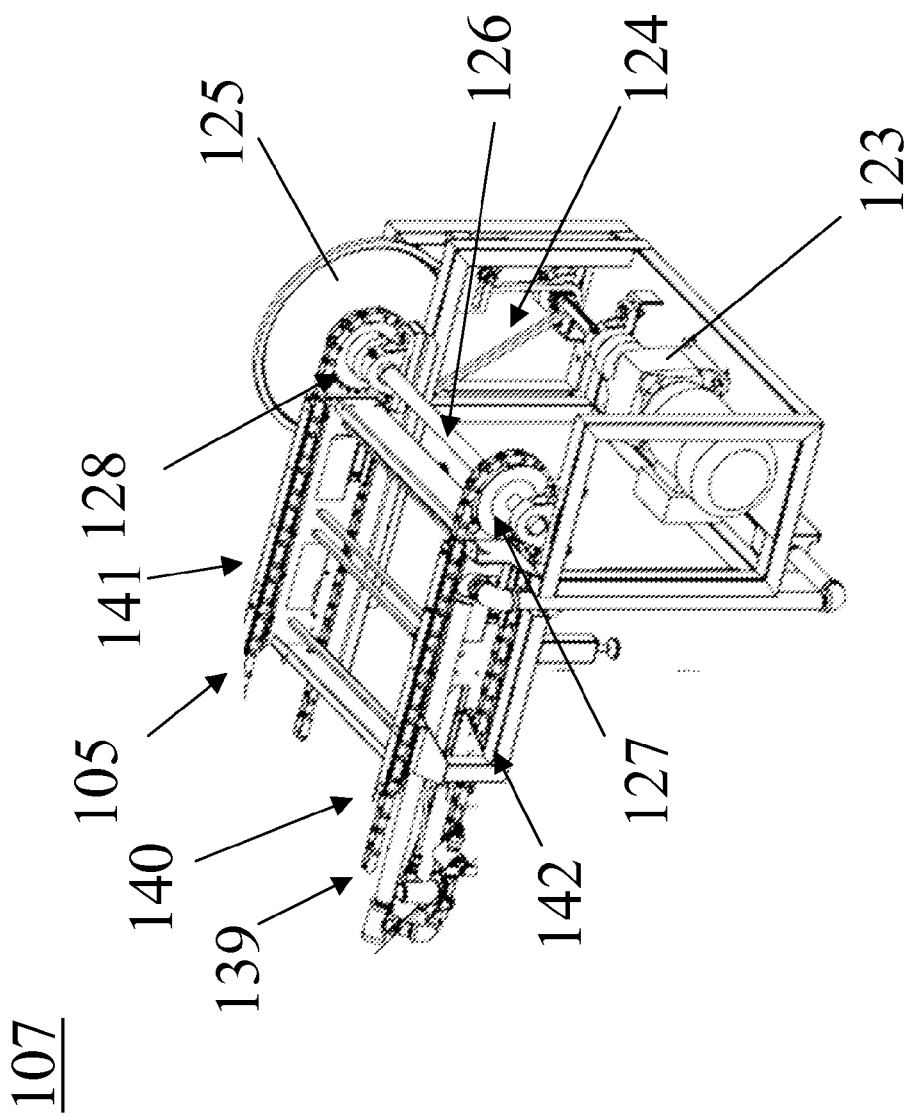
FIG. 5 is a perspective view of the drive assembly of the present invention.

Now referring to FIG. 4, the burner assembles 115-118 are modular and one or more burner assemblies 115-118 may be connected in combination with a drive assembly 107 on one end and a driven assembly 119 on the opposing end of the combination of burner assemblies to create a chain conveyor system 100 for cooking a food item of any length. The modularity of the system allows the chain conveyor system 100 of the present invention to be used and adapted to a variety of locations based on size and output requirements.

Now referring to FIGS. 5-8, the drive assembly 107 is illustrated. The drive assembly 107 comprises an electric motor 123. The drive assembly 107 uses a high quality ball bearing helical gear motor with oil bath lubrication. It is a 1HP 3-phase inverter duty motor, meaning it has higher quality winding insulation to handle variable frequency motor drives, which is more than enough power for this application. The electric motor 123 is connected to the chain 150 by a belt 124 and reduction gear 125. The reduction gear is connected to a shaft 126 with two chain gears 127 and 128 that engages the chains 105 and 139 and transfers the rotational motion and force of the electric motor 123 to the chains 105 and 139. The drive assembly 107 includes a locked control panel 129 with an external on-off switch 130 and emergency stop switch 131. Speed of the electric motor and conveyor is determined by internal controls or setting within the control panel 129.

The drive assembly 107 also includes a removable grease/debris catch tray 132 as well as a clear viewing pane 133 for monitoring operation of the chains 105 and 139, gears 125, 127, and 128, and plates 101 as they move through the conveyor system 100.

Figure 9:
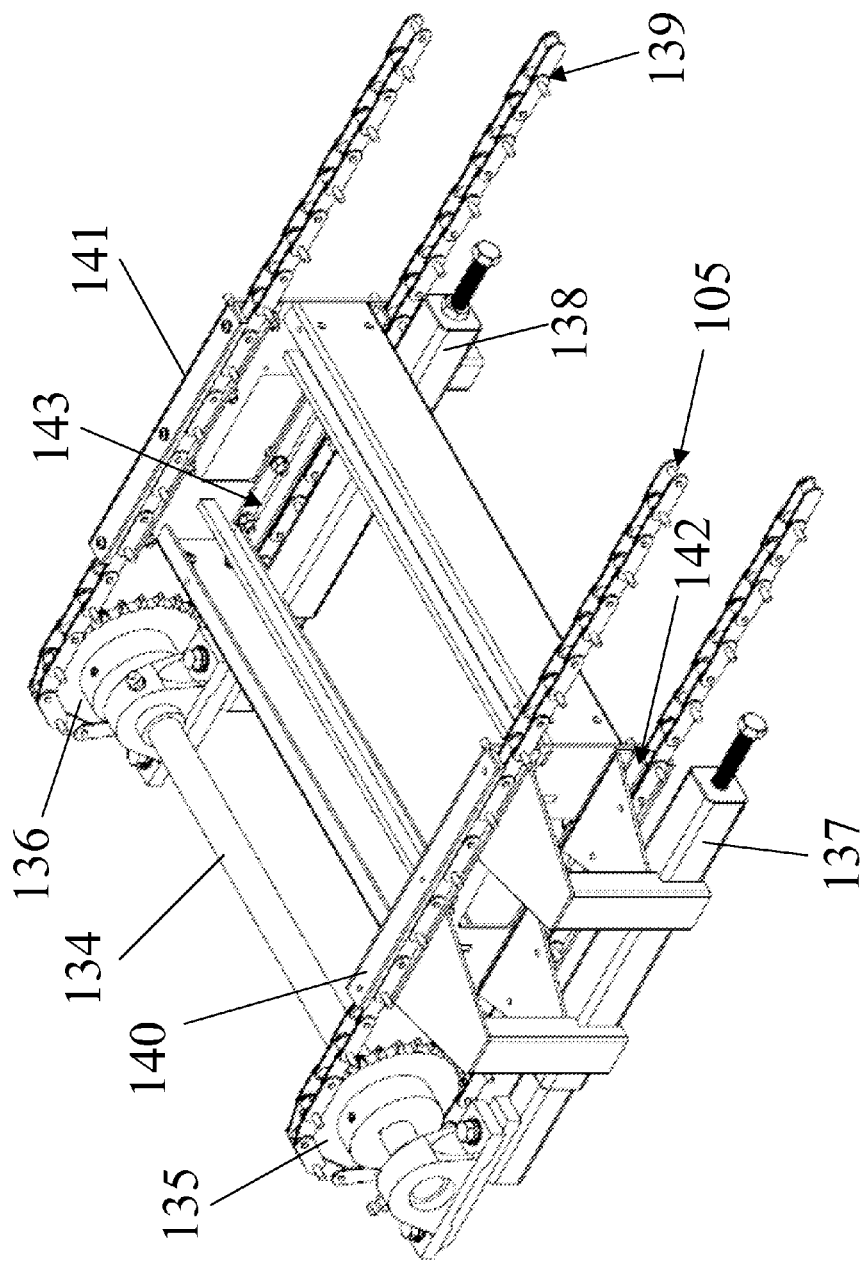
FIG. 9 is a perspective internal view of the driven assembly of the present invention.

Now referring to FIG. 9, the driven assembly 119 provides an opposing end to the drive assembly 107. The driven assembly 119 is comprised of a shaft 134 with two gears 135 and 136 on which the chains 105 and 139 rotates and returns to the drive assembly 107 in the conveyor system. The driven assembly 119 provides a tensioning device 137 and 138 for each of the chains 105 and 139. Chain guides 140 and 141 ensure the chain maintains a straight path from between the drive assembly 107 and the driven assembly 119 by providing a channel and surface for the chains 105 and 139 to follow and ride in. Chain guides 142 and 143 are also provided on the bottom or underside of the conveyor system 100.

Figure 10:
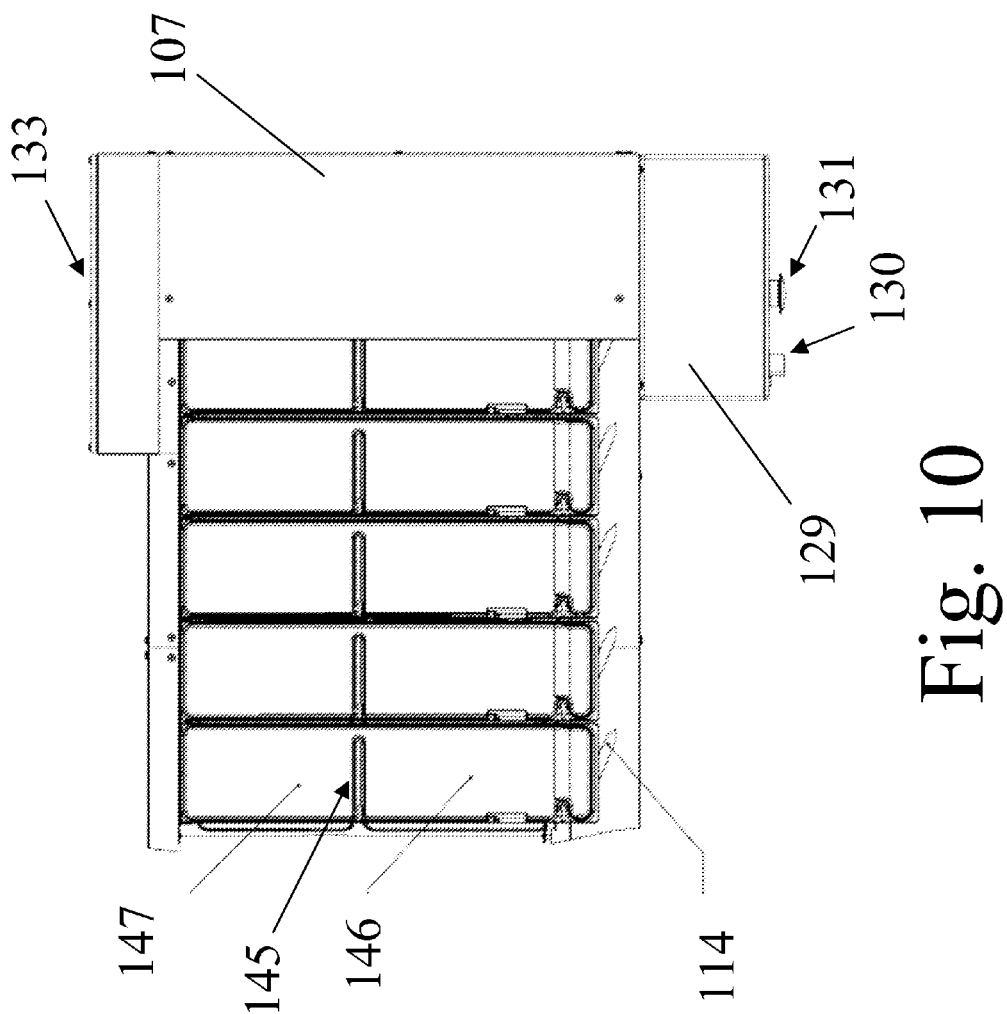
FIG. 10 is a top view of the plates and cooking surface of the present invention.
Figure 11:
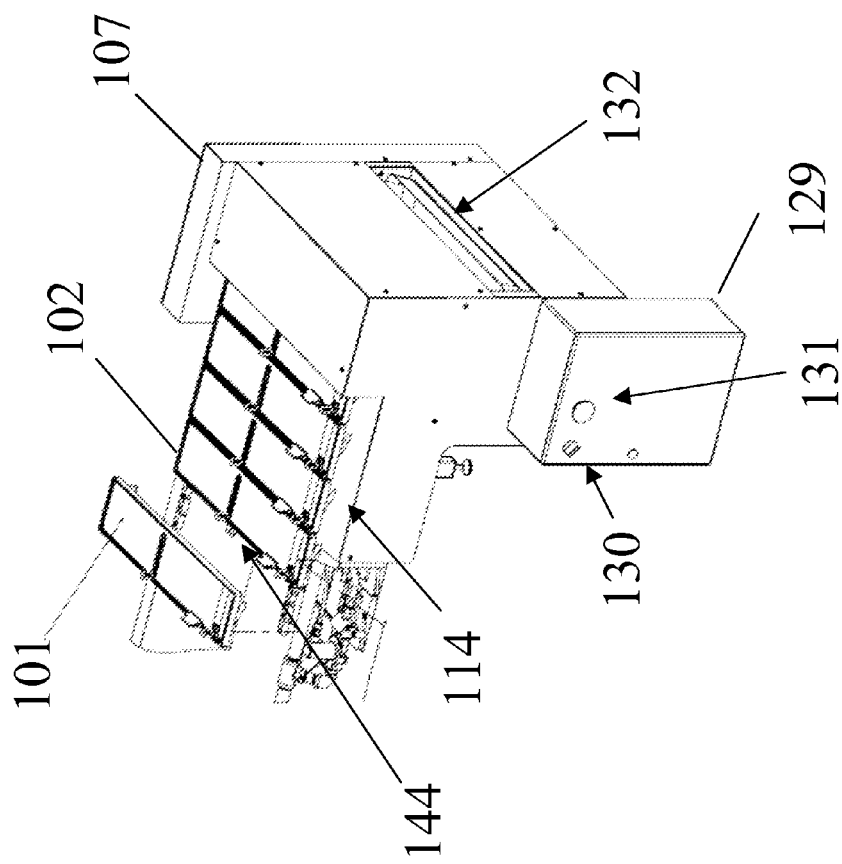
FIG. 11 is a perspective view of the plates and cooking surface of the present invention.

Now referring to FIGS. 10 and 11, each of the individual cooking plates 101 and 102 are attached to the chains 105 and 139. Individual cooking plates 101 and 102 are secured to the chains 105 and 139 and because the fastener attachment 144 is in the center of the plate it does not need to pivot on the fastener attachment 144 at the attachment point. In one embodiment, the weight of the plates is approximately 200 lb on top at once plus the weight of any food items being prepared. The chains 105 and 139 are supported by chain guides 140-143.

In a preferred embodiment, the conveyor system 100 should be approximately 20 feet long and should be designed such that approximately 49 individual plates 101 and 102 (+/−1 plate) are facing upward ("topside") at any one time. One of ordinary skill in the art will appreciate that the conveyor system can be of any length as desired based on several factors such as restaurant size, demand, etc. due to the modularity of the burner assemblies.

Still referring to FIGS. 10-11, the individual plates 101 and 102 should be located adjacent to one another, with the long dimension perpendicular to the direction of plate travel (and therefore, the short dimension parallel to the direction of travel). In a preferred embodiment, each pair of individual plates 101 and 102 should be constructed of cast iron, suitable for commercial equipment. A partition 145 is included approximately midway through the plate that runs parallel with the short dimension of the plate and direction of travel. Currently the present invention teaches a preferred embodiment using cast geometry, thereby eliminating the need to use a nut to install/remove the plates.

Still in FIG. 10, each plate consists of two cooking surfaces 146 and 147 separated by the partition 145 (In FIG. 12 this is a part of the body, not a partition associated with the cook plate) located approximately midway through the plate that runs parallel with the short dimension of the plate and direction of travel. The first cooking surface 146 is located closest to the position of the operator and includes a metal "flag" or "spike" 114 that is simply a rectangular metal post with a point that juts out above the horizontal top edge of the partition 145 provides means for attaching or holding a paper ticket.

In a preferred embodiment, the first cooking surface 146 is used for preparing a food item such as a hamburger, chicken breast or steak that may be placed within a bun. The second cooking surface 147 is used for heating or preparing a bun or second food item for use in combination with the food item being prepared on the first cooking surface 146. The partition 145 acts as a barrier so that oils, sauces, or other cooking matter is not immediately mixed between the food items.

In a preferred embodiment, each plate should be constructed according to the following dimensions: Each pair of individual plates 101 and 102 should be spaced ⅛" to ¼" from the adjacent pair of individual plates 112 and 113. It is especially important to note that each pair of individual plates 101 and 102 has a novel partition 145, approximately midway through the plate that is approximately ½" high and runs parallel with the short dimension of the plate and direction of travel. A metal "flag" or "spike" 114 that is simply a rectangular metal post with a point that juts out above the horizontal top edge of the partition 145 provides means for attaching or holding a paper ticket and facilitating the customization inherent in one piece flow production.

Figure 12:
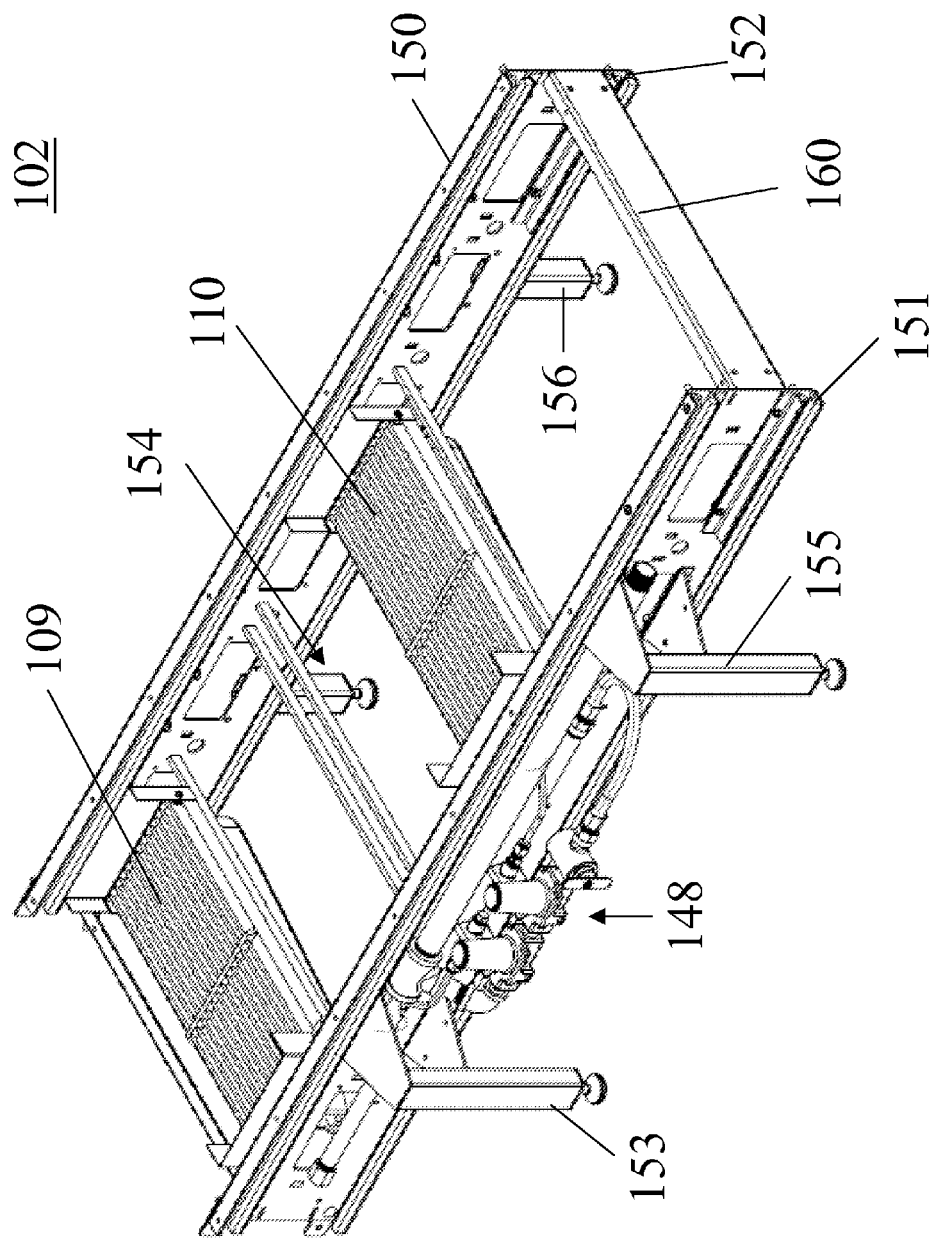
FIG. 12 is a perspective internal view of the burner assembly of the present invention.

Now referring to FIG. 12 the burner assemblies 102 are modular in nature. They are comprised of a frame 160 that provides the structure for connecting multiple burner assemblies together in addition to the drive assembly 107 and driven assembly 119 required to be at opposing ends of the burner assemblies 102. The burner assemblies are comprised of plumbing for providing the burners with gas, electricity or other common energy sources. As illustrated, the burner assemblies 102 are comprised of one or more burners 109 and 110 mounted within the burner assembly frame 160. The burners 109 and 110 provide sufficient heat for the plates moving along the conveyor system above them, resulting in a cooking or griddle area 120 on the top surface of the plates. The burner assemblies 102 are modular in design in such a manner that the frames 160 of multiple burner assemblies 102 can be connected together to create a conveyor system 100 of any desired length. The frames 160 as well as the plumbing 148 and chain guides 149-152 will match up and are easily connected to either burner assemblies 102, a driven assembly 119, or a drive assembly 107.

The operator should be able to control the overall speed of the conveyor system such that each plate remains topside for 1 to 10 minutes. The mechanical control that makes this specification possible should be durable and easy to operate, but not easy to accidentally change. Each plate should be securely fastened to the underlying chain conveyor but should also be able to be easily detached from the conveyor system for cleaning at the end of the day as necessary.

Figure 6:
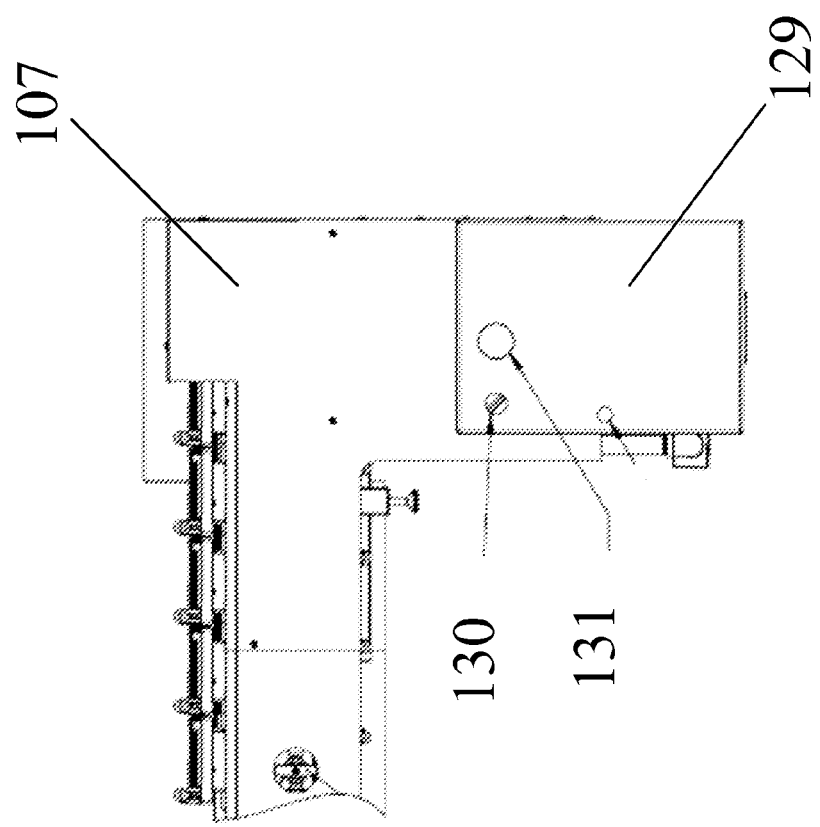
FIG. 6 is a front view of the drive assembly of the present invention.
Figure 7:
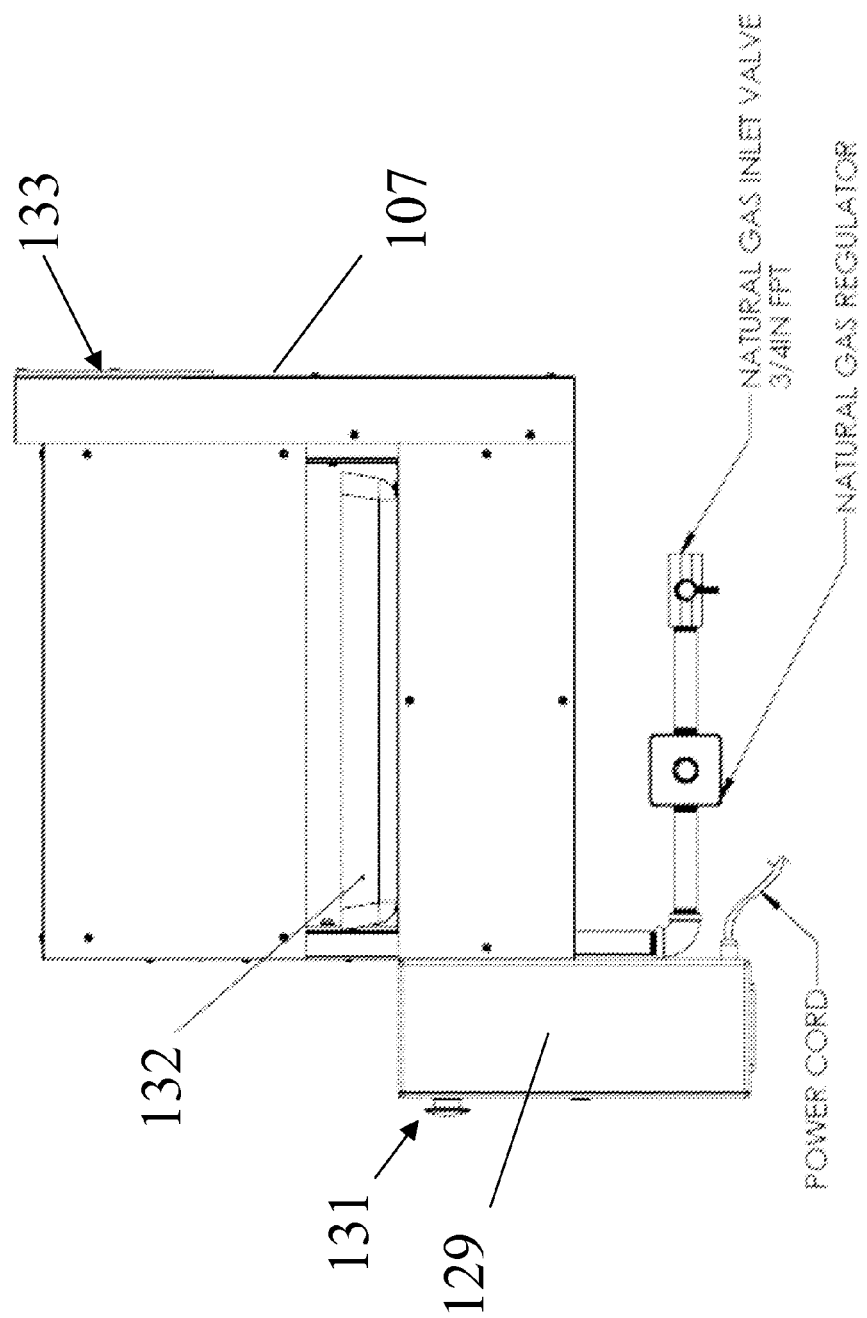
FIG. 7 is a side view of the drive assembly of the present invention.
Figure 8:
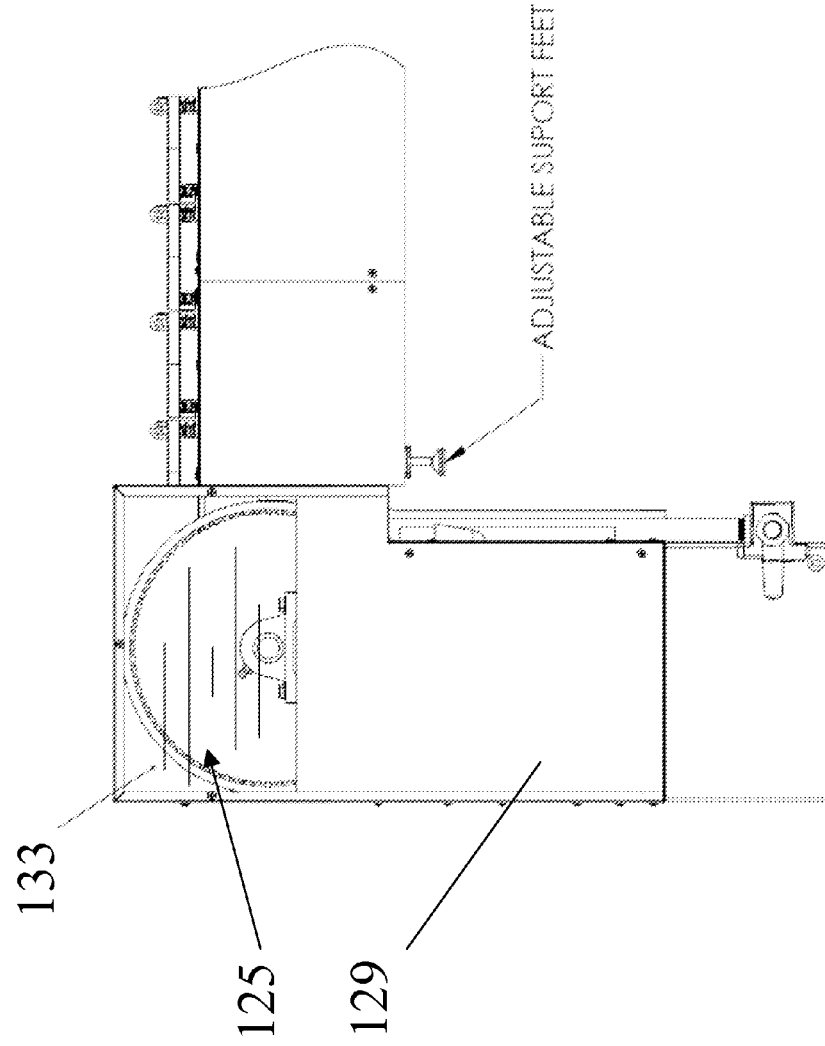
FIG. 8 is a rear view of the drive assembly of the present invention.

As shown in FIG. 6, the electronic controls will be housed in a painted steel NEMA 4X drip proof enclosure 129. The enclosure 129 will house the VFD Drive, line reactor, magnetic contactors, and switches. The power input required will be 20 A ~115V single phase. There will be a digital control panel where a user can change the speed of the conveyor. The motor can be turned on with a simple switch without interfacing with the digital control. There will be an emergency stop button 131 that will safely shut down the system. The device will not re-start in the event of power outage. The enclosure box 129 can be wall mounted or on a stand, or elsewhere, but it must be within approximately 20 feet of the machine. Additionally, another emergency stop could be installed on the machine itself if required.

The whole apparatus should be on simple pedestal feet 153-156 that are capable of being mounted to a separate stainless steel prep surface. The height of the apparatus should be compact and the top surface of the cooking plates should be no higher than 12" (+/−6"), in a preferred embodiment, from the stainless steel prep surface. Finally, the motors that drive the apparatus should be as quiet as possible.

Figure 13:
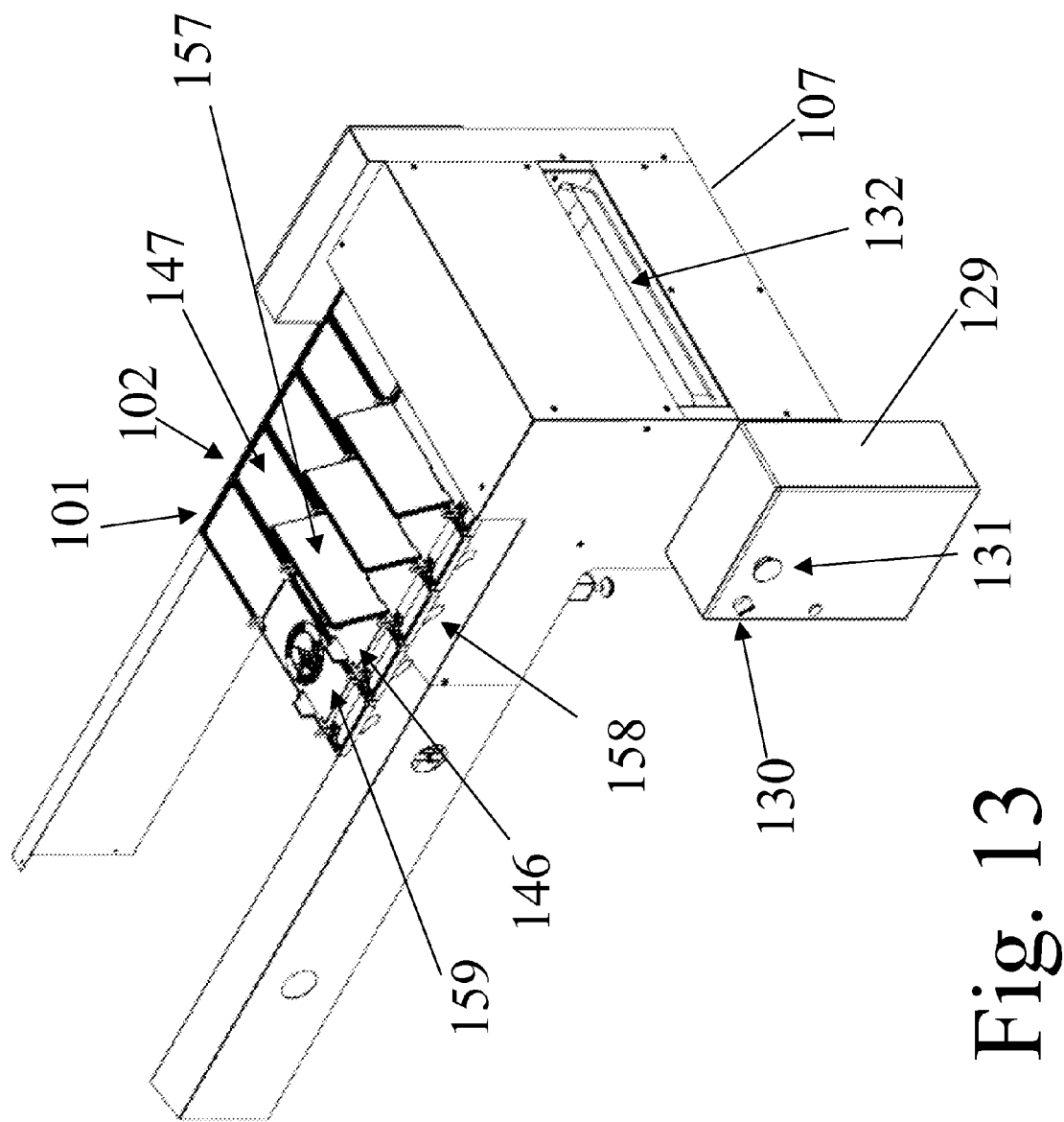
FIG. 13 is a perspective view of and alternative embodiment of the present invention incorporating a smash plate, or a hinged thermal trap, in addition to the plates and cooking surface of the present invention.

In an alternative embodiment, as shown in FIG. 13, a smash plate, or thermal trap, 157 is rotatably connected to the first cooking surface 146 of a metal cooking plate 101. The smash plate 157 is provided to provide slight pressure on the item being cooked and to trap radiant thermal energy, thus accelerating cooking on both sides of a food item being prepared on the first cooking surface 146. The smash plate may be rotated from an open position 158 to a closed position 159 by being rotated on a hinge or equivalent means which secures it a metal cooking plate 101. If desired, a user may place a food item on the first cooking surface 146 while the smash plate 157 is in an open position 158 and then rotate the smash plate 157 to a closed position 159 for faster and more even cooking of the food item located on the first cooking surface 146. The smash plate also acts as a grease guard, preventing grease from splattering on operator's or guests in the vicinity.

The burner assembly heats the series of adjacent plates of the griddle assembly for individually cooking a food product in a customized, one-piece-flow fashion according to a pull system of production. A pull system is a type of production system used in lean production in which production is triggered by demand. In the case of a restaurant or in the food services industry, a pull system is a type of production system that does not produce or create a food item until the order, or demand, is placed. Conversely, a push system is a type of production system based on keeping up with preset inventory levels or with due dates for customer orders rather than customer demand. In the case of a restaurant or in the food services industry, a push system would use a schedule or a projected production plan to fulfill orders that are anticipated, rather than actual orders. While the present invention may be used in both push and pull settings, the main objectives of the present invention provide many improvements over the prior art systems when used in a pull system.

Optional grease guards may be designed to be installed along the length of the Apparatus on one or both sides, if necessary, to arrest grease splatters that occur during the cooking process. These grease guards should be as low profile as possible in order to create the least visual impairment of the cooking process. They should also be created in small, 2' to 3', sections and should be capable of being removed for cleaning Materials considered should include fine, transparent mesh.

In a preferred embodiment, the apparatus of the present invention is intended to allow a customer to watch the food being cooked as it proceeds by the customer queue. Unlike normal quick service or fast food burger restaurants the customer might, while watching the food product being prepared, such as a hamburger, interact in real time with a bun-prep worker to get the appropriate amounts of toppings on their bun and be able to select a variety of final product temperatures, including medium rare. Currently there are no other systems known in the prior art that are able to produce a fresh, made-to-order product in front of the customer, utilizing customer feedback in real-time to create the finished product, at this speed and with an extremely short takt time. Additionally the system more than triples the throughput achieved by two conventional 36" griddles currently used in most quick or fast food establishments.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. An apparatus for cooking food products, comprising:
a series of individual adjacent cook plates resting on chain supports connected to a drive assembly and a driven assembly for continuously moving the series of individual cook plates as a conveyor assembly;
the drive assembly further comprised of an electric motor, a chain, and the chain supports for moving the attached conveyor assembly by chain;
the drive assembly further comprised of controls for adjusting the rate at which the electric motor moves the conveyor assembly;
the driven assembly comprised of an axle and sprockets for attaching to and directing the chain to return to the driven assembly;
at least one burner assembly for heating the series of individual adjacent plates of a griddle assembly for individually cooking a food product;
the series of individual adjacent plates of the griddle assembly are located adjacent to one another, with a long dimension perpendicular to the direction of plate travel and therefore, a short dimension parallel to the direction of travel; and
a smash plate rotatably connected to at least one individual cook plate,
the smash plate providing slight pressure to, and trapping thermal energy for cooking on both sides of, a food item being prepared on the individual cook plate;
the smash plate being rotatable between an open position and a closed position.

2. The apparatus of claim 1, wherein a spike is attached to a second partition of a plate for retaining an order ticket.

3. The apparatus of claim 1, wherein each plate has a partition approximately midway through the plate parallel to the short dimension of the plate.

4. The apparatus of claim 1, wherein the burner assembly is further comprised of a plurality of burner-tubes, infrared burners, or electric heating elements adjustable in their output and capable of heating said plates.

5. The apparatus of claim 1, wherein a heating element consists of one or more natural gas burner-tubes running the length of the conveyor.

6. The apparatus of claim 1, wherein a heating element consists of one or more infrared burners located immediately below said plates and running the length of the conveyor.

7. The apparatus of claim 1, wherein a heating element consists of one or more electric elements located immediately below said plates and running the length of the conveyor.

8. The apparatus of claim 1, wherein the at least one burner assembly is modular.

9. The apparatus of claim 8, wherein two or more burner assemblies are connected in combination with a drive assembly on one end and a driven assembly on the opposing end of the combination of burner assemblies to create a chain conveyor system.

10. The apparatus of claim 1, wherein a partition is located approximately midway through the plate, and parallel to the short dimension of the plate.

11. The apparatus of claim 1, wherein a plurality of burner assemblies are placed between the drive assembly and driven assembly.

12. The apparatus of claim 1, wherein
a plurality of burner assemblies are placed between the drive assembly and driven assembly; and
a plurality of individual adjacent cook plates rest on the chain supports connected to a drive assembly and a driven assembly creating a continuously moving conveyor assembly.

13. The apparatus of claim 1, wherein the overall speed of a conveyor system is such that each plate remains topside in the cooking or griddle area for 1 to 10 minutes.

14. The apparatus of claim 3, wherein the partition defines a first cooking surface on one side of the individual cook plate and a second cooking surface on the other side of the individual cook plate.

15. The apparatus of claim 14, wherein
the first cooking surface of the individual cook plate is located closest to the position of the operator and includes a way to attach a metal spike or having a paper ticket attached to it.

16. The apparatus of claim 14, wherein
the first cooking surface is used for preparing a first food; and
the second cooking surface is available to be used for preparing a second food item.

17. The apparatus of claim 16, wherein the second cooking surface is available to be used for preparing a second food item, which is available for use in combination with the first food item being prepared on the first cooking surface.

18. The apparatus of claim 1, wherein the individual plates are constructed of cast iron, or any metal suitable for commercial cooking equipment.

19. The apparatus of claim 14, wherein
the burner assembly and the driven assembly are supported by simple pedestal feet that are capable of being mounted to or rest on top of a stainless steel prep surface; and
the height of the top surface of the cooking plates is 6-18 inches from the stainless steel prep surface and be level from the drive assembly to the driven assembly.

20. The apparatus of claim 1, wherein the smash plate is rotatable between the open position and the closed position by one or more hinges which secure it to the individual cook plate.

\* \* \* \* \*